May 19, 1970     J. L. LOEWEN     3,512,533
THRESHING CYLINDER BAR
Filed April 28, 1967
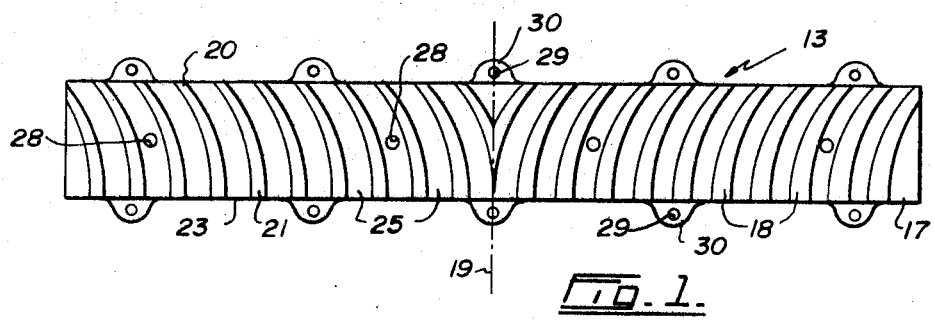
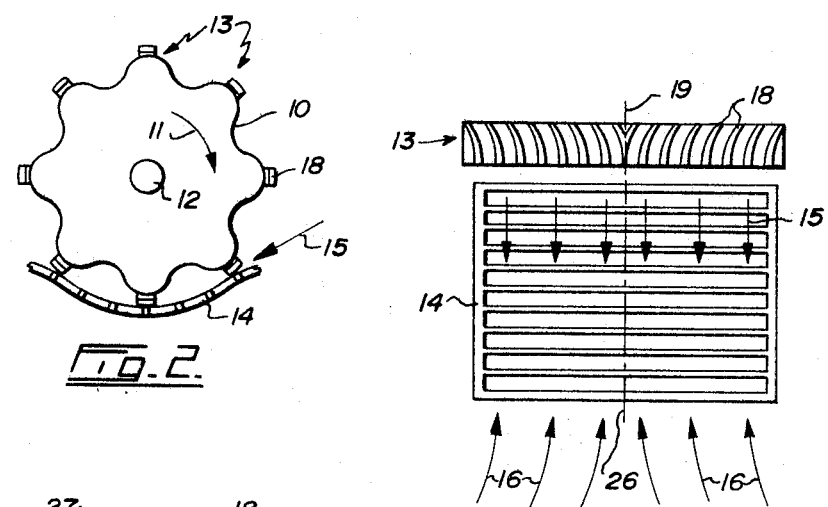
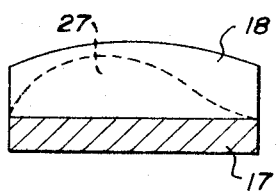
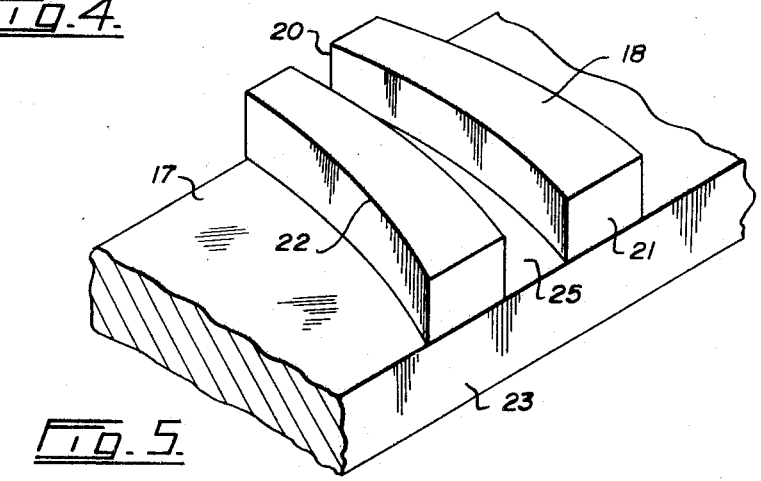
INVENTOR
JACOB L. LOEWEN
BY
HIS ATTORNEY

United States Patent Office 3,512,533
Patented May 19, 1970

3,512,533
THRESHING CYLINDER BAR
Jacob L. Loewen, P.O. Box 820, Altona,
Manitoba, Canada
Filed Apr. 28, 1967, Ser. No. 634,584
Int. Cl. A01f *12/20*
U.S. Cl. 130—27      2 Claims

ABSTRACT OF THE DISCLOSURE

Cylinder bars for combines and the like having arcuately curved teeth curving inwardly from each end towards the centre and having a narrower width at the front than at the rear end thereof. Also the spaces between the teeth widen out from the front to the rear thereof.

---

This invention relates to new and useful improvements in cylinder bars for combine or threshing cylinders.

The threshing cylinder normally holds a plurality of transversely extending cylinder bars having teeth formed thereon. These bars react with the concave of the combine to separate the grain from the straw and chaff whereupon wind is blown through the concave and through sieves following the concave to separate the straw and chaff from the grain. Conventional cylinder bar teeth incline at an angle from one side to the other in order to effect a threshing action. However this has the disadvantage of tending to urge the threshed straw and grain to one side of the concave thus tending to overload this side and leaving the other side relatively vacant.

Attempts have been made to angle part of the teeth in one direction and the other portion of the teeth in the other direction but this has not proven satisfactory due to severe clogging particularly when threshing grain which is slightly moist.

I have overcome these disadvantages by providing a cylinder bar having arcuately curved teeth which incline towards the longitudinal axis of movement of the bar from both sides thereof. Furthermore these teeth increase in width from the front to the back and also the space between adjacent teeth increases in width from the front to the back. This gives the advantage of centralizing and evening out the grain flow over the concave and onto the sieves and at the same time eliminates the dangers of clogging inherent with conventional cylinder bars.

The principal object and essence of the invention is therefore to provide an improved cylinder bar which pulls the straw, chaff and grain towards the center of the concave thus evening the load thereon and enabling the wind blast to be effective over a greater area.

Another object of the invention is to provide a device of the character herewithin described in which the teeth are wider apart at the rear of the bar for easy release of straw thus preventing the straw from wrapping around the cylinder.

Another object of the invention is to provide a device of the character herewithin described which directs the straw, grain and chaff to the area on the concave and sieves having the greater amount of wind.

A yet further object of the invention is to provide a device of the character herewithin described which can be secured to existing cylinders readily and easily.

A yet further object of the invention is to provide a device of the character herewithin described which is simple in construction, economical in manufacture and otherwise well suited to the purpose for which it is designed.

With the foregoing in view, and such other objects, purposes or advantages as may become apparent from consideration of this disclosure and specification, the present invention consists of the inventive concept in whatsoever way the same may be embodied having regard to the particular exemplification or exemplifications of same herein, with due regard in this connection being had to the accompanying figures in which:

FIG. 1 is a top plan view of one of my cylinder bars.

FIG. 2 is a partially schematic end view of a cylinder and concave reduced in scale from FIG. 1.

FIG. 3 is a schematic plan view showing the relationship of one cylinder bar to the concave, reduced in scale from FIG. 1.

FIG. 4 is an enlarged cross sectional view of one of the teeth.

FIG. 5 is a fragmentary, isometric view of one of the bars with the teeth thereon.

In the drawing like characters of reference indicate corresponding parts in the different figures.

Proceeding therefore to describe the invention in detail, reference character 10 illustrates schematically a conventional cylinder rotating in the direction of arrow 11 upon spindle 12. Cylinder bars collectively designated 13 are secured to the cylinder at intervals therearound and extend transversely thereof. These bars react with the concave 14 thus threshing the grain which enters in the direction of arrow 15.

A source of air (not illustrated) is normally provided below the concave and the associated sieve by means of a fan, directing air in the direction of arrow 16. This separates the chaff and straw from the grain.

The cylinder bars 13 comprise a substantially elongated rectangular base portion 17 with a plurality of teeth 18 formed on the upper surface. For purposes of illustration, the bar is divided into left and right hand portions about the longitudinal axis of movement 19.

The teeth shown in detail in FIG. 5, are arcuately curved from the front ends 20 towards the rear ends 21 and these arcuately curved teeth incline towards the longitudinal axis of movement 19 from both sides thereof.

In this particular embodiment, the radius of the upper edges 22 of the teeth are coincident with the rear edge 23 of the base portion 17. This means that not only do the front ends 20 intersect the front edge 24 of the base portion offset from their points of origin on the rear edge but also the front ends are narrower than the rear ends 21 as clearly shown in the drawings.

Of further importance also is the fact that the spaces 25 between adjacent teeth also increase in width from the front edge 24 of the base portion towards the rear edge 23 thereof.

This construction also ensures that the spaces 25 adjacent the rear edge 23 of the base portion are substantially in alignment with the longitudinal axis of the concave 26 and this together with the fact that the front ends of the teeth are offset with respect to the rear ends, ensures that the grain and straw is pulled inwardly towards the concave and flows over the concave in a fairly even manner.

FIG. 4 shows a sectional view of one of the teeth with the profile of existing teeth being shown in phantom and indicated by the reference character 27.

The cylinder bars may be attached to the cylinder either by bolts extending through apertures 28 or through apertures 29 formed in offset lugs 30 along the front and rear edges of the base portion. This means that they are adaptable for use with many of the existing combines or threshing machines on the market and can readily be changed.

Also of note is the fact that the profile of the teeth 18 is higher than conventional teeth thus giving longer use before wear necessitates the replacement of the cylinder bars.

What I claim as my invention is:

1. A threshing cylinder bar having front and rear edges with respect to direction of rotational movement of the bar when mounted on a threshing cylinder, and two sets of spaced teeth provided on said bar at the respective opposite sides of its longitudinal center, the teeth in each set extending from the front edge to the rear edge of the bar and being curved in the plane of the bar so that the end of each tooth at said rear edge is closer to said longitudinal center than the end of the same tooth at said front edge, the curvature of each tooth being such that a straight tangential extension of the tooth beyond said rear edge would be parallel to said direction of rotational movement of the bar.

2. The device as defined in claim 1 which is further characterized in that each tooth has opposite side edges which are mutually divergent from the front edge of the rear edge of said bar, and in that spaces between the teeth defined by the tooth side edges are also divergent from the front edge to the rear edge of the bar.

References Cited

UNITED STATES PATENTS

| | | | |
|---|---|---|---|
| 3,034,513 | 5/1962 | Ausherman | 130—27 |
| 3,203,428 | 8/1965 | Ausherman | 130—27 |

FOREIGN PATENTS 157.433   6/1939   Austria.

ANTONIO F. GUIDA, Primary Examiner